United States Patent [19]
Ellgoth et al.

[11] Patent Number: 5,305,792
[45] Date of Patent: Apr. 26, 1994

[54] USED OR WASTE WATER COLLECTION SYSTEM FOR AN AIRCRAFT

[75] Inventors: Hubert Ellgoth; Helge Frank, both of Hamburg; Gerd Grunwald, Neuenkirchen; Georg Mai, Bremen; Karolin Mau; Ralf Schliwa, both of Hamburg, all of Fed. Rep. of Germany

[73] Assignee: Deutsche Aerospace Airbus GmbH, Hamburg, Fed. Rep. of Germany

[21] Appl. No.: 954,892

[22] Filed: Sep. 30, 1992

[30] Foreign Application Priority Data

Sep. 30, 1991 [DE] Fed. Rep. of Germany ....... 4132491
Aug. 20, 1992 [DE] Fed. Rep. of Germany ....... 4227517

[51] Int. Cl.⁵ .......................... A01G 25/09; E03B 7/00
[52] U.S. Cl. .............................. 137/899.2; 137/236.1; 137/624.11; 4/406; 4/663
[58] Field of Search ............. 137/236.1, 899.2, 624.11, 137/624.18, 899; 4/663, 406

[56] References Cited

U.S. PATENT DOCUMENTS

| | | | |
|---|---|---|---|
| 3,780,757 | 12/1973 | Jordan | 137/209 |
| 3,956,776 | 5/1976 | Vanden Broek | 137/236.1 |
| 4,162,218 | 7/1979 | McCormick | 4/663 |
| 4,176,371 | 12/1979 | Foreman et al. | 137/236.1 |
| 4,188,968 | 2/1980 | Trobaugh et al. | 137/236.1 |
| 4,744,385 | 5/1988 | Houghton | 4/663 |
| 4,791,949 | 12/1988 | Tank | 137/236.1 |

Primary Examiner—A. Michael Chambers
Attorney, Agent, or Firm—W. G. Fasse; W. F. Fasse

[57] ABSTRACT

A used or waste water collection system for an aircraft has a waste water collection pipe that connects a kitchen sink with a collecting tank through a controllable valve. The waste water is transported by reduced pressure. For this purpose, the collecting pipe is connected to the suction system present in the aircraft, especially for removing sewage from the flushing of a toilet basin in the aircraft.

9 Claims, 4 Drawing Sheets

USED OR WASTE WATER COLLECTION SYSTEM FOR AN AIRCRAFT

CROSS-REFERENCE TO RELATED APPLICATION

The present invention relates to U.S. patent application Ser. No. 07/954,898, filed on Sep. 30, 1992; and to U.S. patent application Ser. No. 07/954,896, filed on Sep. 30, 1992.

FIELD OF THE INVENTION

The invention relates to a used or waste water collection system for an aircraft, wherein water using devices are connected through waste water conduits with a collection reservoir. The waste water is transported through the waste water conduits by applying suction to these conduits.

BACKGROUND INFORMATION

Conventional waste water disposal systems in aircraft kitchens have the disadvantage that a separate conduit is necessary in order to blow out the waste water from the aircraft body into the environment. The connection of a hand wash basin in the toilet to the outside of the aircraft is accomplished, either directly without the intermediary of a discharge valve or by using such a discharge valve, also referred to as drain stop valve.

The just described waste water discharge systems in commercial aircraft treat waste water from kitchen sinks and waste water from hand wash basins in the toilet in the same manner by discharging all the waste water to the environment through which the aircraft is flying. However, sewage from toilet basins and water for flushing toilets in an aircraft is collected in a sewage water tank. Conventionally, the conveyance of the sewage to the tank takes place by applying reduced pressure to the sewage collection tank.

Where drain stop valves are not used, cabin air continuously escapes through the drainage conduits because the air pressure within the aircraft is higher than the pressure of the environment through which the aircraft is flying. Where such a drain stop valve is used, a liquid column accumulates on a spring biased flap. When the liquid column reaches a weight that exceeds the biasing force of the spring, the valve is briefly opened, whereby the waste water is discharged as long as the flap remains open. Depending on the type of construction, such a drain stop valve has a diameter of about 200 mm. This required valve dimension imposes its limitation on the structural features of the location where such valves can be installed. Especially, when available space is limited, for example, in an on-board kitchen, it may become necessary to install the valve in a space that would otherwise be available as a storage space. Such storage space may be even large enough to take up half of a serving cart.

As a result, conventional waste water disposal systems in an aircraft require a high installation effort and expense involving high material costs as well as a substantial installation effort. Further, the conventional dimensions for the structural components of such systems reduce the useful effect or capacity of such conventional components.

OBJECTS OF THE INVENTION

In view of the foregoing, it is the aim of the invention to achieve the following objects singly or in combination:

to construct a waste water collection system for an aircraft in such a manner that the system itself and its installation is simplified and its initial as well as operation costs are reduced;

to avoid the discharge of waste water to the atmosphere surrounding an aircraft in flight, thereby also avoiding the respective structural components conventionally needed for this purpose, such as a drain mast and the like;

to provide a centralized valve control for such a waste water collection system in an aircraft;

to use collected waste water for flushing the toilets in an aircraft; and to make sure that any odor generated in the waste water collection cannot spread into the cabin air.

SUMMARY OF THE INVENTION

The waste water collection system for an aircraft comprises, according to the invention, a waste water collecting container connected to a kitchen sink through a controllable valve through which reduced pressure is applied to the kitchen sink from a reduced pressure source for transporting waste water from the kitchen sink into the collection container by suction.

By connecting the kitchen sink directly through a valve to the collecting container a separate pipe system for discharging the waste water to the environment through which the aircraft is flying is no longer needed. Further, any freeze-up or icing danger resulting from such conventional discharge is also avoided, while simultaneously obviating conventional devices, such as a drain mast and the like.

An electromechanical, or rather electromagnetic valve between the kitchen sink and the collecting container provides an especially compact and simply controllable embodiment.

Where a plurality of kitchen sinks are to be connected to the collection container or tank, the valves are connected through electrical control conductors to a central control unit which coordinates all valves within the aircraft to open one drain at a time.

The total water volume needed for a particular flight, is reduced by using collected waste water for flushing toilet basins in the aircraft.

Especially for smaller aircrafts, it is feasible to provide a manually operated valve between the kitchen sink and the collecting tank for the waste water.

In order to avoid an overflow of the collecting tank, and to minimize problems with the waste water handling, a filling level sensor is provided in the waste water tank and the respective valve or valves are controlled by a signal generated by the filling level sensor.

A cost efficient construction of the collecting container, especially for smaller aircraft, can be provided in the form of a sufficiently sized pipe elbow installed in the vicinity of the kitchen sink.

In a preferred embodiment, the waste water system is constructed as part of or connected to a vacuum system that removes the water used for flushing toilet basins. Such a system preferably applies a continuous reduced pressure to the waste water installation so as to avoid the spreading of odor.

The present system is quite compatible with the requirements made by an aircraft purchaser with regard to the interior outfitting of an aircraft, whereby the same type of aircraft may be equipped with quite different interior outfits. According to the invention, standardized locations are provided in the aircraft for the installation of one or more kitchens and one or more toilets, which are all interconnected with a common vacuum discharge system that can be connected to any suitable number of discharge locations.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
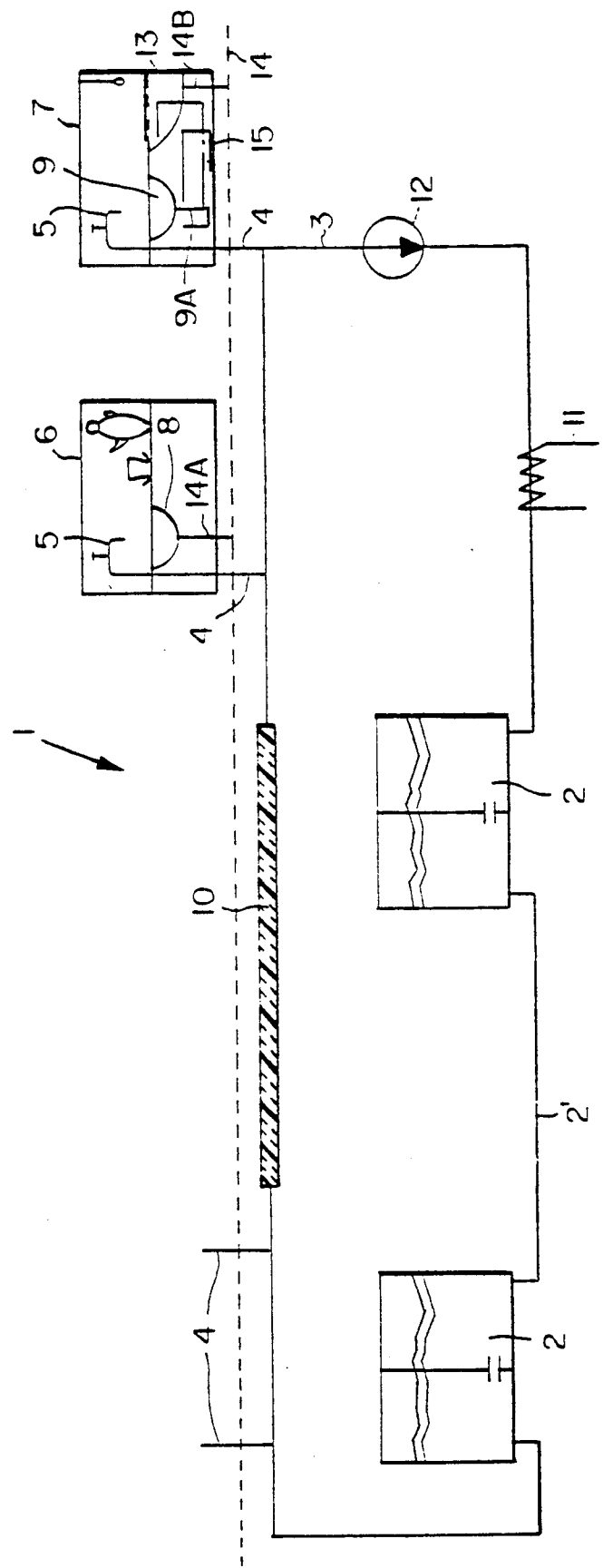
FIG. 1 is a simplified diagram of one embodiment of a fresh water supply system according to the invention with a ring conduit forming the main line.

FIG. 1 shows, in addition to the fresh water supply for an aircraft a waste water discharge pipe or duct 14 leading to a collection tank 17 shown in FIG. 2 to be described in more detail below with reference to FIG. 2. FIG. 1 shows primarily the fresh water supply system 1 including supply tanks 2 connected by a main ring line 3 to the faucets 5 connected, for example, by branch lines 4 to the ring line 3. One faucet 5 is provided in a kitchen 6 while the other faucet 5 is located in a toilet 7. In the kitchen the faucet 5 cooperates with a kitchen sink 8 and in the toilet the faucet 5 cooperates with a hand wash basin 9. To reduce heat loss, a portion of the ring line 3 is preferably insulated as shown at 10. Instead of a ring line 3, other pipe installations may be used, such as a single connection line.

A heater 11, for example, an electrical heater, which heats part of the ring conduit section tempers the water before it enters into the tanks 2. A pump 12 circulates the water in the ring conduit of the main line 3. Heater 11 may be rather small.

Figure 2:
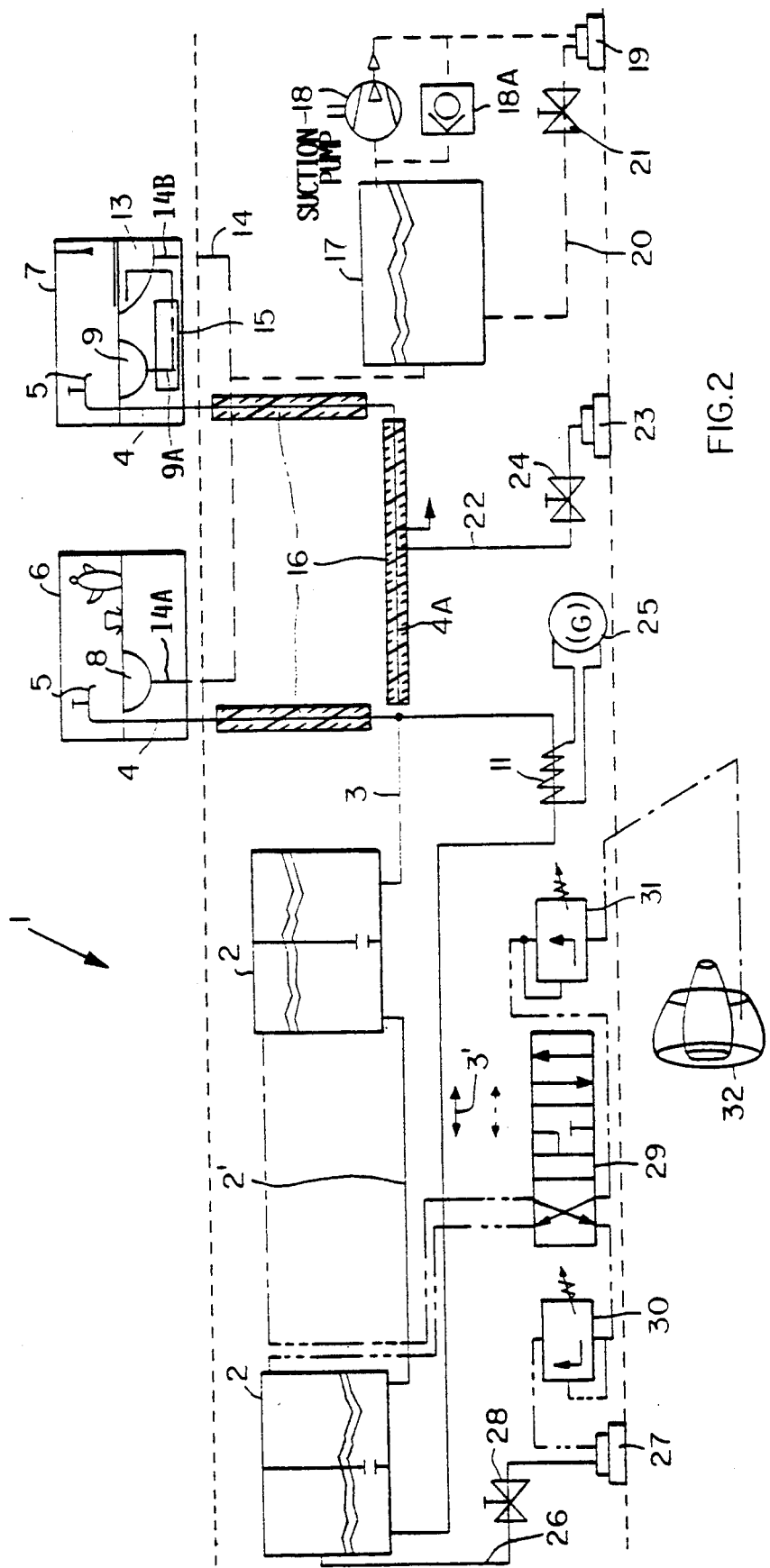
FIG. 2 is an embodiment in which a ring conduit type main line is connected to a source of air pressure or suction through a respective valve so that the water can flow in the main line in one or the other direction.

The kitchen sink 8 and the toilet basin 13 are connected through discharge pipes 14A and 14B to a waste water duct 14 leading to a waste water collection tank shown at 17 in FIG. 2. The basin 9 in the toilet 7 is connected through a discharge pipe 9A into an auxiliary waste water collection tank 15. The water in the auxiliary waste water tank 15 is used for flushing the toilet basin 13. As long as there is sufficient waste water in the tank 15, a separate supply of water for flushing the toilet basin 13 is not necessary. However, the supply of water for flushing the toilet basin 13 may also or instead be connected to the main line 3. The arrangement may be such that toilet flushing may take place either out of the waste water tank 15 or out of the main line 3 depending on the filling level in the waste water tank 15. In order to avoid an overflow in the waste water tank 15, the latter may be provided with an overflow discharge port or an automatic flushing of the toilet may take place in response to a certain filling level within the waste water tank 15.

FIG. 2 shows an embodiment in which individual branch lines are provided with heat insulation 16. The waste water discharge duct 14 is connected to a waste water tank 17 which in turn is connected to a suction pump 18 for producing and maintaining a reduced pressure inside the volume of the waste water tank 17. The pressure side of the suction pump 18 is connected to an evacuation port 19, for example, in the body wall of an aircraft. The evacuation port 19 is also connected through a waste water discharge line 20 and a valve 21 to the tank 17 for emptying on the ground. A non-return valve 18A is connected in parallel to the suction pump 18. A draining port 23 is connected through a drainage line 22 and a valve 24 to branch lines 4 and 4A. As mentioned, the branch lines 4 lead to a water faucet 5 in the kitchen 6 and to a water faucet 5 in the toilet 7. The valve 24 permits an intentional draining of these branch lines 4, e.g. for maintenance work.

The heater 11 is constructed as a through flow or instantaneous electrical heater energized by a generator 25. One of the two supply tanks 2 is connected through a supply line 26 with a supply port 27 through a valve 28. The supply port 27 may also be constructed for venting the tanks 2 as well as for permitting air entry into these tanks. The valve 28 prevents an unintended discharging of the content of the tanks 2.

Both supply tanks 2 are connected to a combination valve 29 for permitting a water flow or circulation through the tanks 2 and the ring conduit or main line 3 in either direction. A pressure limiter 30 is arranged between the supply port 27 and one port of the combination valve 29. Another port of the combination valve 29 is connected to a pressure reducer 31 which in turn leads through a line 32A to a water tap 32, such as a drinking fountain. The combination control and venting valve 29 operates to alternately pressurize one of the tanks and then the other and vice versa so that a flow direction reversal is achieved in the ring conduit or main line 3 as indicated by the arrow 3'. Valve 29 is connected to a suction or pressurizing device not shown.

Figure 3:
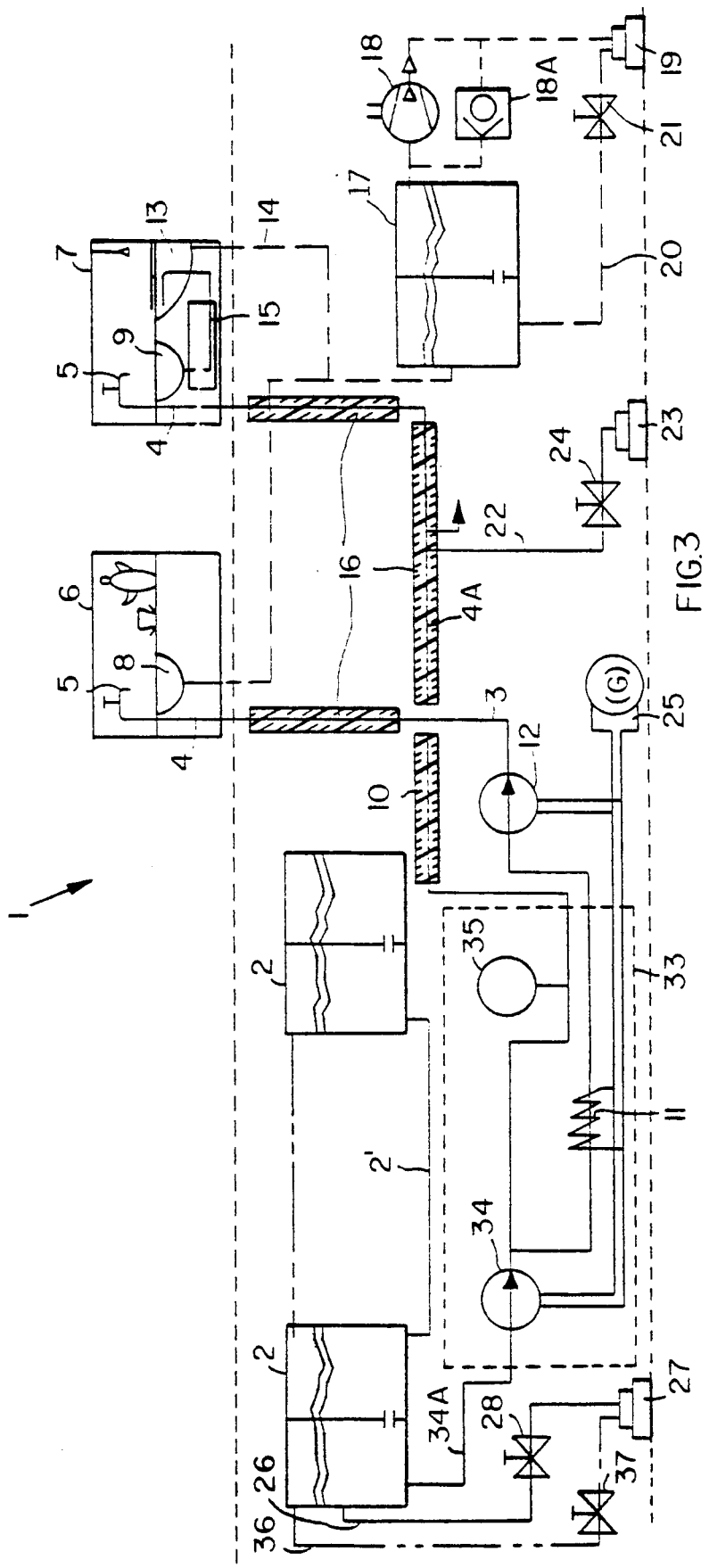
FIG. 3 is a view similar to that of FIG. 2, however, providing a pump in the ring conduit to cause the required water flow.

Referring to FIG. 3, the suction or pressurizing device switched on by the combination valve 29, has been replaced by a water circulating pump 12 and by a further pump 34 to be described below. A hot water automat 33 heated by the through flow heater 11 is connected to the ring main line 3. The pump 34 forms part of the hot water automat 33 which also comprises a pressurized tank 35. The pump 34 feeds water from the tank 2 through the main line 3. In this embodiment the tanks 2 are not connected into the main line 3, rather the tanks 2 are connected to the main line 3 through a pipe 34A leading to the suction inlet of the pump 34, the motor of which is driven by a power source 25. The tanks 2 are interconnected by a pipe 2'. The two pumps 12 and 34 can be combined into a single pump unit. The tanks 2 are substantially not pressurized, but the pressurized tank 35 assures a uniform pressure in the ring line 3 independently of the water level in any of the tanks 2. The pressurized tank 35 has, for example, a volume of 20 liters which has been found to be sufficient. However, other desirable volumes for the pressurized tank 35 may be used. The tanks 2 are vented through a venting duct 36 connected through a valve 37 to a filling or supply port 27 as mentioned above. The filling port 27 is connected through the filling pipe 26 and a valve 28 to the tank 2. The branch lines 4 and the main ring line 3 can, for example, be emptied by introducing a pressurized gas or by applying suction to these lines. Where the installation provides for a drainage by gravity flow, the tanks and lines may be emptied by such gravity flow. Alternatively, the tanks 2 may be emptied by suction or by blowing.

Instead of using a single loop main line 3 as shown in FIGS. 1, 2, and 3, a plurality of ring lines or loops may be used and arranged in a matrix type structure. Depending on the arrangement of such a matrix structure, one or several water conveying devices for the fresh water may be provided. Further, the tanks may either be integrated into the loops, or at least into one loop or they may be connected through branch lines as shown at 34A in FIG. 3. Similarly, faucets, taps and the like may be connected through branch lines 4 to the main line 3 or these taps and faucets may be connected directly into the main line by respective pipe couplings, thereby forming an integral component of the main line 3.

Instead of constructing the heater 11 as an automatic through flow heater, an immersion heater may be used in one or both tanks. Also, a heat exchanger could be connected to the tanks instead of a through flow heater and instead of an immersion heater. The heat exchanger could be operated with waste heat from the cabin. The fresh water flow may be maintained by one of the three above mentioned possibilities, namely the pump 12 or an alternating pressurization and evacuation or even by gravity flow.

Figure 4:
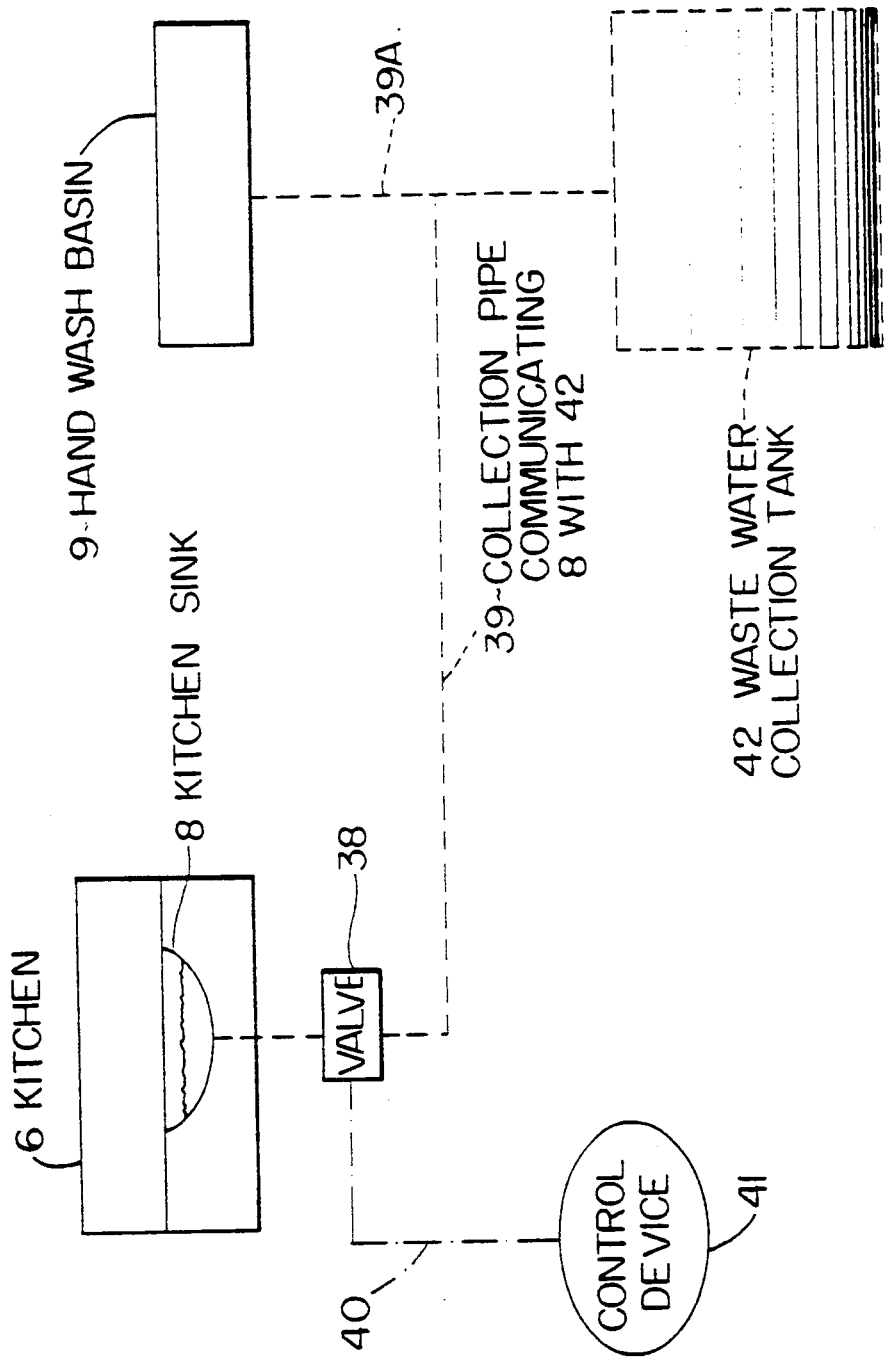
FIG. 4 is a simplified illustration of connecting a kitchen sink or kitchen hand wash basin to a waste water collecting tank of the invention.

According to FIG. 4, the kitchen sink 8 is connected through a controllable valve 38 to a waste water collection pipe 39 communicating the sink 8 with a waste water collection tank 42 through the controllable valve 38. The collection pipe 39 is also connected through a branch line 39A to a hand wash basin 9, which in turn is connected to a suction system as shown in FIGS. 2 and 3.

The controllable valve 38 may, for example, be an electromechanically, or rather, electromagnetically controlled valve that is connected through a control conductor 40 to a control device 41, for example, a simple electrical switch to be closed by an attendant when the kitchen sink 8 is to be emptied. However, the control unit 41 may also be a control circuit that coordinates several waste water producing devices, or rather their respective control valves 38. Such coordinated control may still involve an electrical switch directly at the respective kitchen sink but the circuit is arranged so that only one switch can be effective at a time to open one valve 38 at a time for draining the respective sink so as not to overload the suction system and accordingly maintain a sufficient reduced pressure or suction for transporting the waste water into the collection tank 42 and for preventing odor escape.

Draining one kitchen sink or hand wash basin at a time has the advantage that clogging of the plumbing system is substantially reduced, and that odor escape is prevented as long as only one valve 38 is opened at a time.

The content of the waste water collection tank 42 may be used for flushing the toilet basin 13 shown in FIGS. 1, 2, and 3.

A separate waste water collection tank 42 can be replaced or avoided by connecting the waste water pipe 39 through the valve 38 to the collection duct 14, which connects the toilet basin 13 with the waste water or sewage tank 17. However, such an embodiment does not permit using the waste water for flushing the toilet. Thus, a separate collection of the waste water from the sewage from the toilet may be preferably, unless installation costs must be minimized.

As mentioned, the operation of the controllable valve 38 may be accomplished manually or automatically in response to the individual requirements at the particular kitchen sink. For small aircraft it may not be necessary to use an electrically controlled valve 38. Rather, a mechanically or manually operated valve may be suitable. The valve 38 may also be controlled in response to an actually present water pressure.

Although the invention has been described with reference to specific example embodiments, it will be appreciated that it is intended to cover all modifications and equivalents within the scope of the appended claims.

What we claim is:

1. A waste water collection system in an aircraft, comprising at least one waste water discharging sink (8, 9), a waste water collection tank (17, 42), an individual pipe section (14A) communicating said waste water discharging sink with said collection tank (17, 42), a controllable valve (38) connected in said individual pipe section, at least one toilet (13), a toilet effluent conduit (14) connecting said toilet to said collection tank (17, 42), suction means (18) connected to said system for transporting waste water from said waste water discharging sink and from said toilet into said collection tank, said suction means (18) constantly maintaining a reduced pressure in said system for said transporting and for suppressing an odor emission, and valve control means (40, 41) connected to each said control valve (38) in said individual pipe section for individually controlling an application of suction to said system for said transporting, said valve control means controlling said controllable valves (38) in such a way that only one valve (38) is open at a time, whereby clogging of said system and or escape are prevented.

2. The waste water collection system of claim 1, wherein said controllable valve (38) comprise an electromagnetic means for opening and closing said controllable valve one at a time.

3. The waste water collection system of claim 1, further comprising an auxiliary waste water collection tank (15) connected to said sink and to said toilet to form a supply tank for flushing a toilet in said aircraft with waste water from said tank.

4. The waste water collection system of claim 1, wherein said controllable valve is also manually operable.

5. The waste water collection system of claim 1, further comprising filling level sensor means in said waste water collection tank for producing a filling level dependent control signal, and wherein said controllable valves (38) are electromagnetic valves responsive to said control signal dependent on said filling level.

6. The waste water collection system of claim 5, wherein said waste water collection tank comprises an auxiliary waste water collection tank (15), and wherein said filling level sensor means is arranged in said auxiliary waste water collection tank (15).

7. The waste water collection system of claim 6, wherein said auxiliary waste water collection tank is a curved pipe section located near one of said waste water discharging devices (8).

8. The waste water collection system of claim 1, wherein said aircraft comprises standardized locations for kitchens and toilets, and wherein said suction means comprise a common suction pipe (14) connected to said waste water collection tank (17), said individual pipe sections (14A, 14B) being connected to said common suction pipe (14), said waste water discharging sinks comprising kitchen sinks (8) in said kitchen locations and toilets (13) in said toilet locations, whereby said kitchen sinks and said toilets are individually connected to said common suction pipe (14).

9. The waste water collection system of claim 1, wherein said individual pipe section (14A) connected to said waste water discharging sink (8, 9) through said controllable valve (38), is connected to said toilet effluent conduit (14) and through said toilet effluent conduit (14) to said collection tank (17, 42).

* * * * *

UNITED STATES PATENT AND TRADEMARK OFFICE
CERTIFICATE OF CORRECTION

PATENT NO.   : 5,305,792
DATED        : April 26, 1994
INVENTOR(S)  : Ellgoth, et al It is certified that error appears in the above-indentified patent and that said Letters Patent is hereby corrected as shown below:

Column 6, line 43, replace "or" by —odor—;
Column 6, line 52, replace "tank" by —sink—.

Signed and Sealed this

Second Day of August, 1994

Attest:

BRUCE LEHMAN

Attesting Officer       Commissioner of Patents and Trademarks